(12) United States Patent
Warden

(10) Patent No.: US 10,914,339 B2
(45) Date of Patent: Feb. 9, 2021

(54) FLEXURAL PIVOT ASSEMBLY WITH SHAPED BLADE SECTIONS

(71) Applicant: Ball Aerospace & Technologies Corp., Boulder, CO (US)

(72) Inventor: Robert M. Warden, Louisville, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 134 days.

(21) Appl. No.: 16/141,593

(22) Filed: Sep. 25, 2018

(65) Prior Publication Data

US 2020/0096038 A1    Mar. 26, 2020

(51) Int. Cl.
*F16C 11/12*    (2006.01)
*F16F 1/16*    (2006.01)

(52) U.S. Cl.
CPC ............... *F16C 11/12* (2013.01); *F16F 1/16* (2013.01); *F16F 2230/0076* (2013.01); *F16F 2232/02* (2013.01); *F16F 2236/08* (2013.01); *F16F 2238/022* (2013.01)

(58) Field of Classification Search
CPC .................................. F16C 1/16; F16C 11/12
See application file for complete search history.

(56) References Cited

U.S. PATENT DOCUMENTS

| | | |
|---|---|---|
| 3,181,851 A | 5/1965 | Troeger |
| 3,181,918 A | 5/1965 | Troeger |
| 3,252,696 A | 5/1966 | Friedel |
| 3,465,997 A | 9/1969 | Piske |
| 3,807,029 A | 4/1974 | Troeger |
| 3,811,665 A | 5/1974 | Seelig |
| 3,813,089 A | 5/1974 | Troeger |
| 3,825,992 A | 7/1974 | Troeger |
| 4,261,211 A | 4/1981 | Haberland |
| 4,327,527 A | 5/1982 | Seelig et al. |
| 4,533,100 A | 8/1985 | Paseri |

(Continued)

FOREIGN PATENT DOCUMENTS

| | | |
|---|---|---|
| DE | 3241373 | 5/1984 |
| EP | 0348845 | 1/1990 |

(Continued)

OTHER PUBLICATIONS

International Search Report and Written Opinion for International (PCT) Patent Application No. PCT/US2019/035723, dated Sep. 24, 2019 17 pages.

(Continued)

*Primary Examiner* — Thomas W Irvin
(74) *Attorney, Agent, or Firm* — Sheridan Ross P.C.

(57) ABSTRACT

Flexural pivot structures and methods are provided. A flexural pivot as disclosed allows for rotation of a pivoted member relative to a base member about a central axis, while inhibiting or preventing movement of the pivoted member relative to the base member in any other direction. Base and pivoted sections of the flexural pivot structure are connected to one another by a set of resilient blades or flexural members. A thickness of the blades varies with the distance from the central axis. The components of the flexural pivot can comprise a monolithic structure that is formed from a single piece of material.

20 Claims, 8 Drawing Sheets

(56) References Cited

U.S. PATENT DOCUMENTS

| | | | | |
|---|---|---|---|---|
| 4,637,596 | A * | 1/1987 | Lewis | F16C 11/12 |
| | | | | 267/160 |
| 4,655,629 | A * | 4/1987 | Flaherty | F03G 7/065 |
| | | | | 267/160 |
| 4,678,295 | A | 7/1987 | Fisher | |
| 4,770,522 | A | 9/1988 | Alten | |
| 4,802,720 | A | 2/1989 | Paulsen | |
| 4,802,784 | A | 2/1989 | Brooks | |
| 4,812,072 | A | 3/1989 | Brooks | |
| 4,825,713 | A | 5/1989 | Wilkey | |
| 4,919,382 | A | 4/1990 | Forman | |
| 4,919,993 | A * | 4/1990 | Woodruff | F16C 11/12 |
| | | | | 216/2 |
| 4,997,123 | A | 3/1991 | Backus et al. | |
| 5,283,682 | A | 2/1994 | Ostaszewski | |
| 5,521,740 | A | 5/1996 | Brosens | |
| 5,529,277 | A | 6/1996 | Ostaszewski | |
| 5,620,169 | A | 4/1997 | Payne | |
| 5,703,732 | A | 12/1997 | Boddy et al. | |
| 6,275,624 | B1 | 8/2001 | Seddon | |
| 6,365,252 | B1 * | 4/2002 | Ortiz | F16C 11/12 |
| | | | | 156/250 |
| 6,972,885 | B2 | 12/2005 | Hiley et al. | |
| 7,354,170 | B2 | 4/2008 | Ishikawa | |
| 7,515,385 | B1 * | 4/2009 | Abrahamson | G11B 5/5569 |
| | | | | 360/264.6 |
| 8,556,533 | B2 * | 10/2013 | Bullard | F16C 11/12 |
| | | | | 403/291 |
| 8,702,337 | B2 * | 4/2014 | Whitney | F16C 11/12 |
| | | | | 403/220 |
| 8,708,593 | B2 * | 4/2014 | Stratton | B23P 11/00 |
| | | | | 403/119 |
| 9,212,691 | B2 * | 12/2015 | Smith | F16C 11/12 |
| 9,354,422 | B1 | 5/2016 | Quakenbush | |
| 9,612,436 | B1 | 4/2017 | Hoffman et al. | |
| 10,443,649 | B2 * | 10/2019 | Balaban | F16C 11/12 |
| 2010/0208322 | A1 | 8/2010 | Borchers | |
| 2014/0208848 | A1 | 7/2014 | Krylov et al. | |
| 2018/0196257 | A1 | 7/2018 | Ostaszewski | |
| 2018/0252260 | A1 * | 9/2018 | Bullard | F16C 11/12 |
| 2018/0252261 | A1 * | 9/2018 | Bullard | F16C 11/12 |
| 2019/0120287 | A1 * | 4/2019 | Cosandier | F16D 3/005 |
| 2020/0008827 | A1 * | 1/2020 | Dearden | B25J 15/0233 |

FOREIGN PATENT DOCUMENTS

| | | |
|---|---|---|
| EP | 1013949 | 6/2000 |
| EP | 1887398 | 2/2008 |

OTHER PUBLICATIONS

Markovic et al. "Characterization of cross-spring pivots for micropositioning applications," Proceedings of SPIE, Smart Sensors, Actuators, and MEMS VII; and Cyber Physical Systems, May 2015, vol. 9517, 951727, 8 pages.

* cited by examiner

FLEXURAL PIVOT ASSEMBLY WITH SHAPED BLADE SECTIONS

FIELD

The present disclosure generally relates to flexural pivots for supporting mechanisms and allowing them to be limitedly rotated or pivoted about an axis.

BACKGROUND

A variety of designs of flexural pivots have been proposed for mounting a movable structure, such as an oscillating mirror, to a fixed support. Generally, flexural pivots utilize two mounts, for example in the form of two axially aligned, cylindrical housings, and typically a plurality of flexure members or blades. In some configurations, each of the flexure members in known flexural pivots are separately and mechanically attached, for example via brazing or clamping, to both of the mounts, but are not directly attached to each other. In other configurations, the flexure members are formed integrally with one another and with the mounts. The flexure members or blades allow a limited degree of rotation or pivoting of one mount relative to the other while providing a degree of "torsional-like" resistance to such movements. An example of an integral flexural pivot is described in U.S. Pat. No. 5,620,169, the disclosure of which is incorporated herein by reference in its entirety.

The mounts of the flexural pivot interconnect the two desired structures, such as a fixed support and an oscillating mirror. One type of mount which has been utilized for flexural pivots is a pair of substantially cylindrical and axially aligned housings. Generally, each of these housings have a cylindrical end structure with an arcuately-shaped tab (e.g., less than 180 degrees) projecting from an end of the cylindrical end structure. The cylindrical end structures of the two housings are on opposite ends of the flexural pivot and the projecting tabs of the housings extend within the interior of the cylindrical end structure of the other housing. The housings are interconnected by the flexure members or blades, which are themselves interconnected to one another along a central axis, and which permit the housings to rotate relative to one another about the central axis, while preventing relative movement in other dimensions.

Many applications of flexural pivots require that the flexural pivot enable rotation about the primary axis of the flexural pivot, while providing the ability to support a moveable element of a given mass. Moreover, it is often important to ensure that the rotation occurs without any "decentering" of the mounts during relative movement between the mounts. Rotation or a pivoting of one mount relative to another mount is achieved by a bending of the flexure members. Therefore, simply providing stiffer flexure members and/or an increased number of flexure members to increase the strength of a given flexural pivot can result in a flexural pivot that requires an unacceptably large amount of power to rotate.

SUMMARY

Embodiments of the present disclosure provide systems and methods for providing a flexural pivot having shaped blade sections. More particularly, the thickness of the blades varies with distance from the blade centerline, in order to provide desired load, flexibility, and fatigue life characteristics. A flexural pivot as disclosed herein can be formed as a unitary structure from a single piece of material.

A flexural pivot in accordance with embodiments of the present disclosure includes first and second housings that are connected to one another by a plurality of blades. More particularly, a first end of each blade is interconnected to the first housing, and a second end of each blade is interconnected to the second housing. The blades intersect one another along a center or rotational axis of the flexural pivot. In addition, each of the blades is shaped.

In accordance with at least some embodiments of the present disclosure, the shaping of the blades includes providing blades having a first thickness at a first distance from the center axis and second thickness at a second distance from the center axis. The shaping of the blades can further include blades featuring one or more thinned sections. In accordance with other embodiments of the present disclosure, the shaping of the blades provides blades having a thickness that varies with distance from the center axis to the first or second end of the respective blade. In accordance with embodiments of the present disclosure, each blade is symmetric about the center axis.

In accordance embodiments of the present disclosure, the flexural pivot is provided as part of an assembly that includes a pivoted assembly or member that is connected to a base assembly or member by the flexural pivot. More particularly, the flexural pivot allows the pivoted assembly or member to pivot or rotate relative to the base, while restricting or prohibiting movement of the pivoted assembly relative to the base in other directions. Moreover, embodiments of the present disclosure incorporate a flexural pivot that features shaped blades, which enable such pivoting at a lower power input and/or an increased fatigue life as compared to a similar assembly having the same or a similar load capacity or strength.

Additional features and advantages of embodiments of the present disclosure will become more readily apparent from the following description, particularly when taken together with the accompanying drawings.

DETAILED DESCRIPTION

Figure 1:
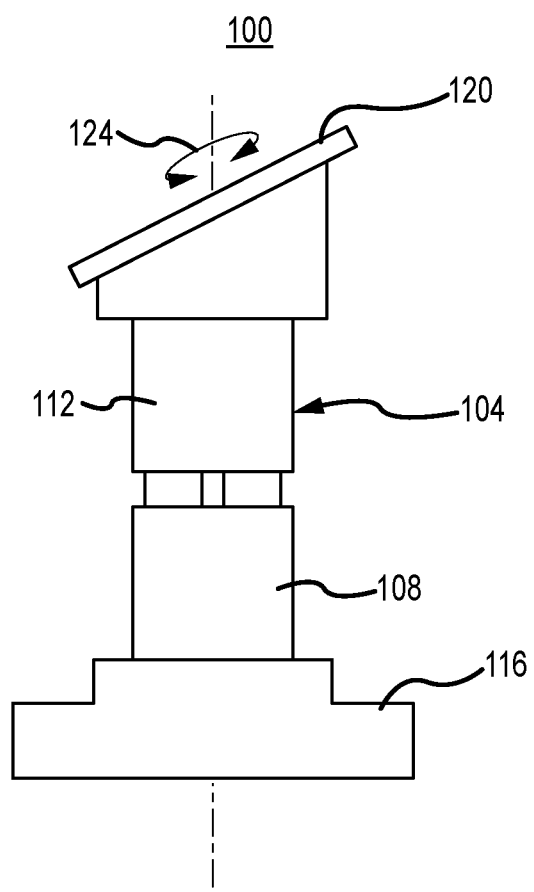
FIG. 1 is a view in elevation of an assembly incorporating a flexural pivot in accordance with embodiments of the present disclosure.

A pivot assembly 100 incorporating a flexural pivot 104 in accordance with embodiments of the present disclosure is illustrated in FIG. 1. The flexural pivot 104 includes a first or base section 108 that is connected to a second or pivoted section 112. The base section 108 of the flexural pivot 104 can be fixed to a base member or assembly 116, while a pivoted member or assembly 120 can be fixed to the pivoted section 112. In general, the flexural pivot 104 allows the pivoted assembly 120 to rotate about a center axis 124 by some amount, such as +/−10 degrees, relative to the base assembly 116, while preventing or inhibiting movement of the pivoted assembly 120 in any other direction relative to the base assembly 112. In the illustrated example, the pivoted member or assembly 120 is a mirror, such as a fast steering mirror. However, it should be appreciated that a flexural pivot 104 as disclosed herein can be used to allow any assembly or member to be pivoted or rotated about a center axis relative to a base where the range of rotation is relatively limited.

Figure 2:
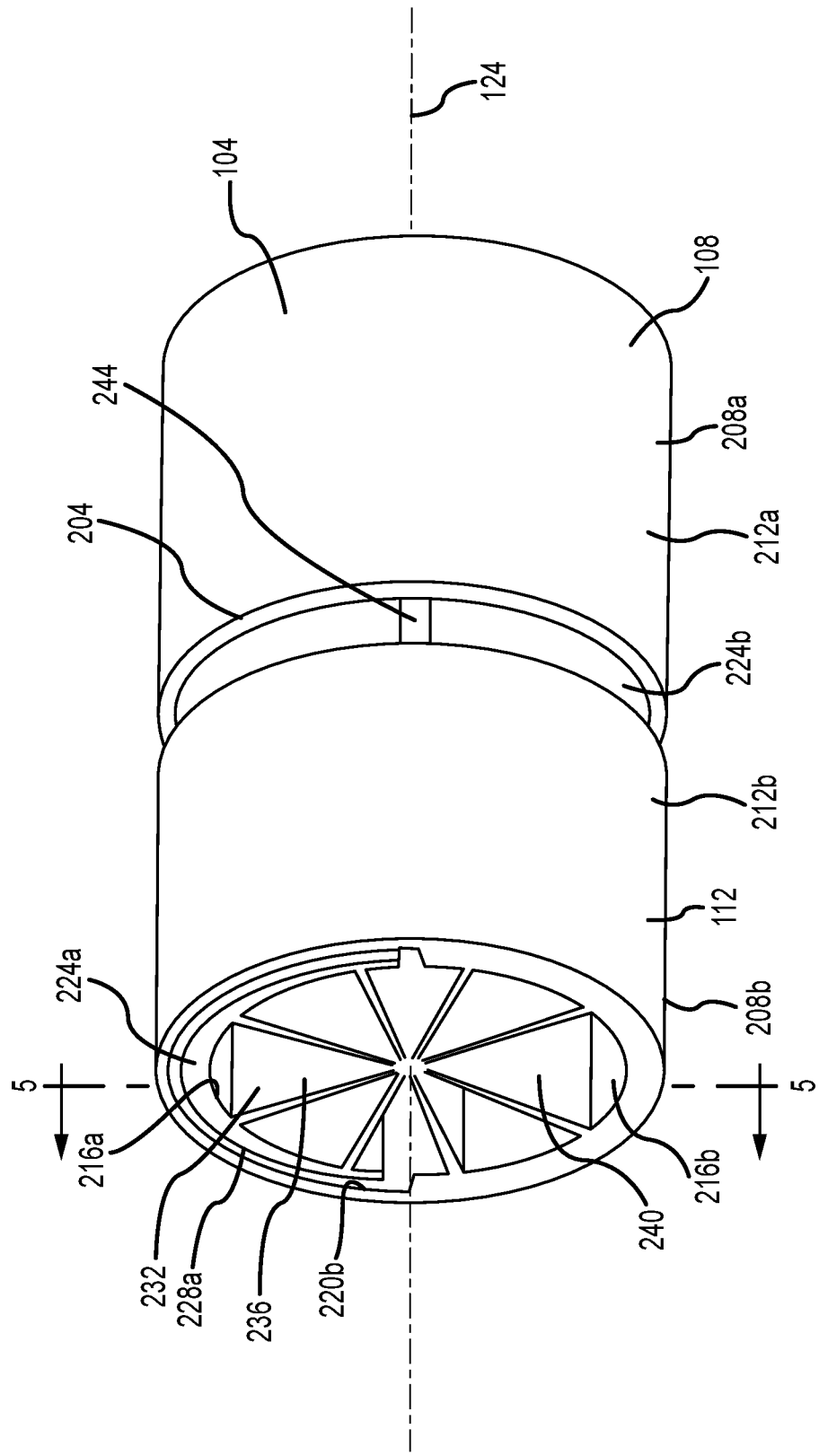
FIG. 2 is a perspective view of a flexural pivot in accordance with embodiments of the present disclosure.
Figure 3:
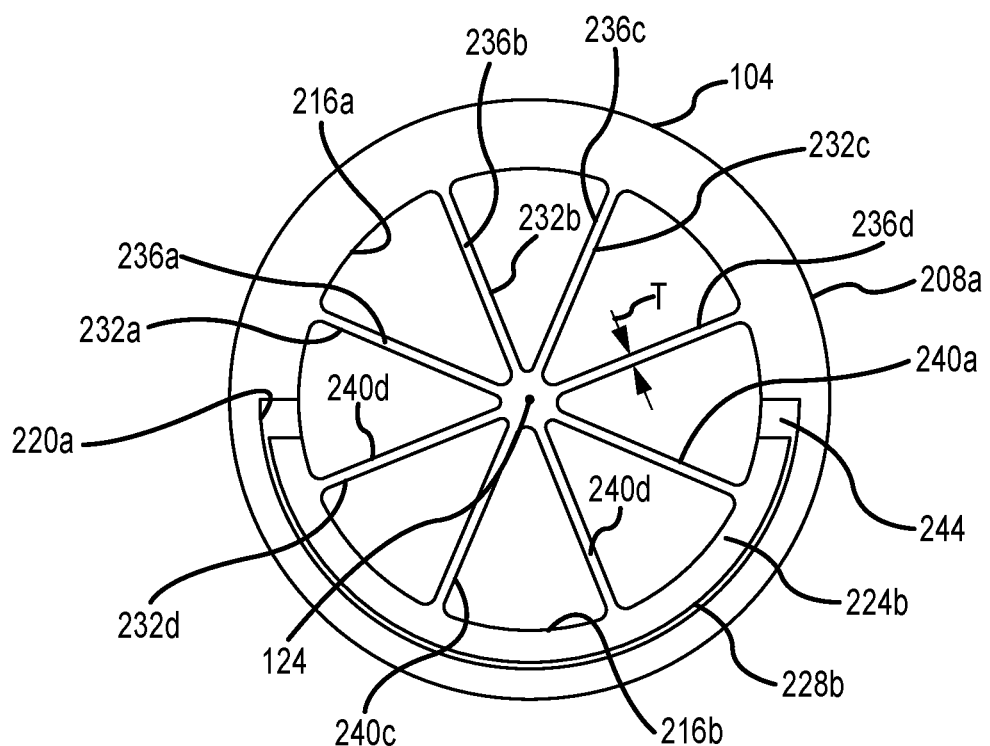
FIG. 3 is a first end view of the flexural pivot of FIG. 2.
Figure 4:
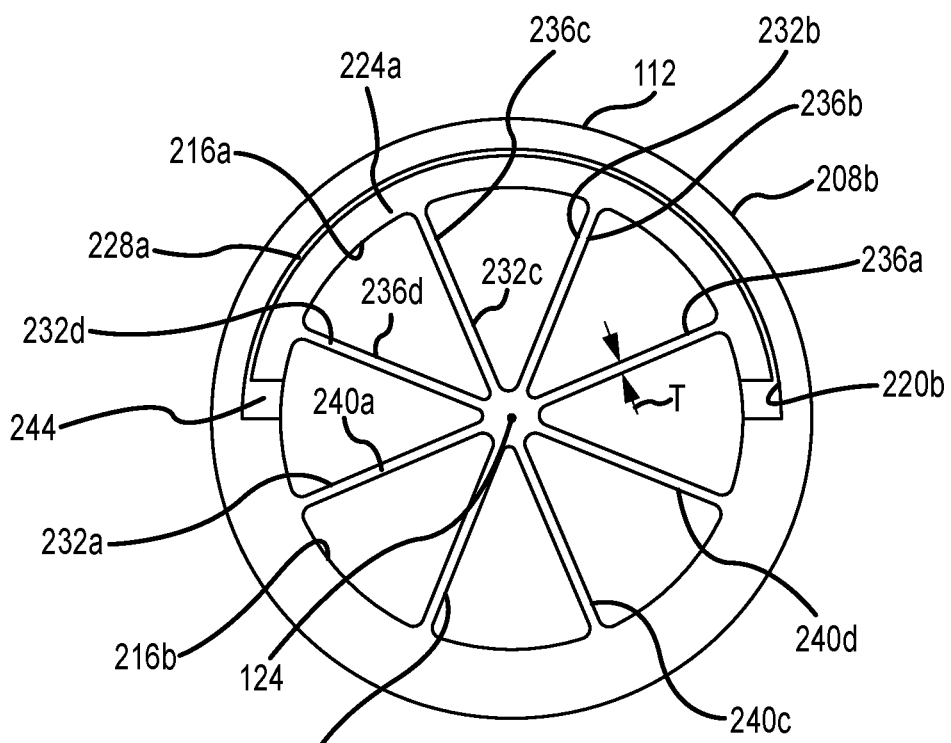
FIG. 4 is a second end view of the flexural pivot of FIG. 2.
Figure 5:
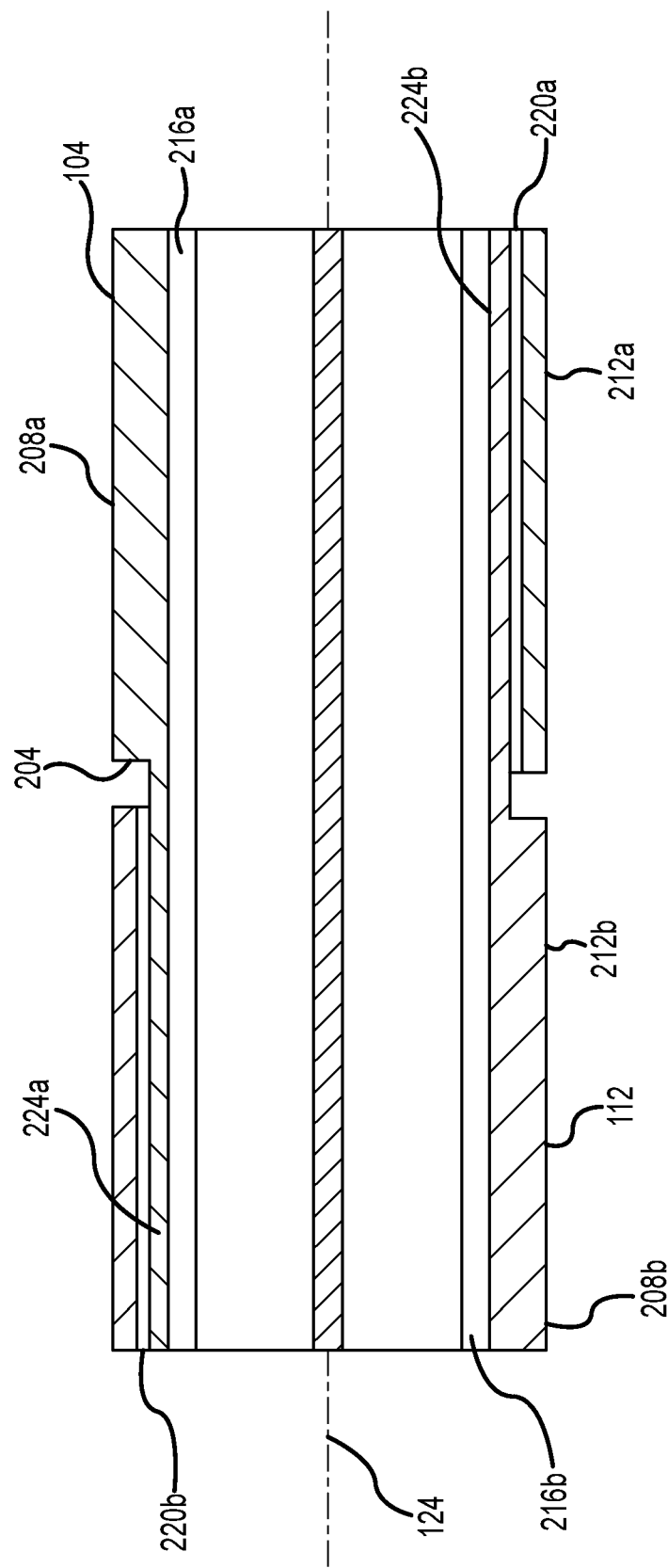
FIG. 5 is a cross-sectional view of the flexural pivot of FIG. 2 taken along line 5-5.

FIG. 2 is a perspective view, FIG. 3 is an end view from a first side, FIG. 4 is an end view from a second side, and FIG. 5 is a cross section of a flexural pivot 104 in accordance with embodiments of the present disclosure. As shown, the base section 108 can be axially aligned with the pivoted section 112. In particular, the pivoted section 112 can be rotated relative to the base section 108 about a center or pivot axis 124. The base 108 and pivoted 112 sections are separated by a circumferential groove 204. In the illustrated embodiment, the base 108 includes a first end section 208a, and the pivoted section 112 includes a second end section 208b. Each end section 208a and 208b is shown as featuring a substantially cylindrical exterior surface 212a and 212b respectively. However, any shape, is possible. Alternatively or in addition, the exterior surfaces 212a and/or 212b can include provisions, such as threaded holes, bosses, mounting tabs, or other features to facilitate fixing the respective sections 108 and 112 to a base assembly 116 and a pivoted assembly 120 respectively.

The first end section 208a includes a substantially cylindrical inner surface 216a with a recessed portion 220a formed therein that receives a tab 224b that extends from the second end section 208b. Likewise, the second end section 208b includes a substantially cylindrical inner surface 216b with a recessed portion 220b formed therein that receives a tab 224a that extends from the first end section 208a into an interior volume of the second end section 208b. An outer surface 228a and 228b of each of the tabs 224a and 224b adjacent the respective recessed portions 220a and 220b is arcuately-shaped, to follow the curve of the respective recessed portion 220, forming a space therebetween. Moreover, each of the tabs 224 continues the interior surface 216 of the respective end section 208.

The end sections 208a and 208b are joined to one another by a set of resilient blades 232 that are centered on the center axis 124. More particularly, each blade 232 includes a first blade half 236 that extends between an interior surface 216a of the first end section 208a to the center axis 124, and a second blade half 240 that extends between an interior surface 216b of the second end section 208b and the center axis 124. In the illustrated embodiment, the flexural pivot 104 includes four blades 232, each including a first blade half 236a-d and a second blade half 240a-d respectively. In accordance with embodiments of the present disclosure, the blades 236 are symmetrical about the center axis 124. Moreover, the blades 232 extend along the center axis 124 such that they are adjacent at least a portion of the first end section 208a and a portion of the second end section 208b. For example, as shown in the embodiment illustrated in FIGS. 2-5, the blades 232 extend along the entire length of the first end section 204a and the second end section 208b.

The length of the arc described by each of the tabs 224 is less than 180 degrees, and is less than the length of the arc described by the recessed portions 220. In accordance with embodiments of the present disclosure, the tabs 224 are centered in their respective recessed portions 220 when the flexural pivot 104 is in an unflexed condition. Accordingly, rotation by some amount that is no greater than the arcuate length of the gap 244 between an end of the recessed portion 220 and an edge of a tab 224 received by the recessed portion is possible in either direction around the center axis 124. Alternatively, the gap 244 can be asymmetrical. For example, a gap 244 can exist between an edge of a tab 224 on one side of the flexural pivot 104, to allow rotation in a direction that would close or make that gap narrower, while the gap 244 along the opposite side of the flexural pivot can be small or non-existent while the flexural pivot 104 is in a relaxed state, such that rotation in the opposite direction is more limited than the other direction or is inhibited entirely.

Figure 6:
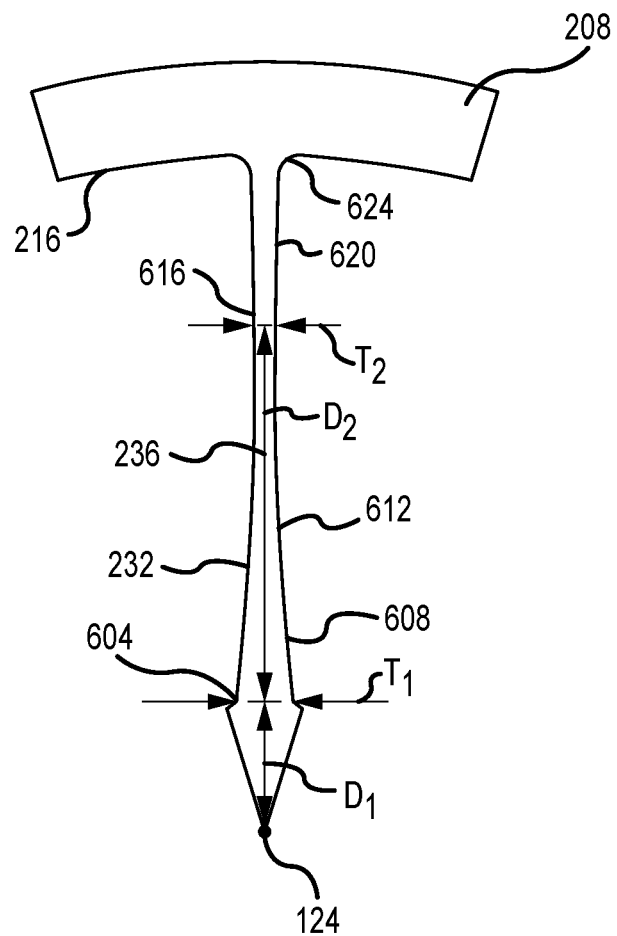
FIG. 6 is detailed view of a blade of a flexural pivot in accordance with embodiments of the present disclosure.

In accordance with embodiments of the present disclosure, each blade 232 has a first dimension or thickness T that varies with distance D from the center axis 124. FIG. 6 illustrates a half (e.g. a first blade half 236) of a blade 232 that varies in thickness with distance from the center axis 124 in accordance with embodiments of the present disclosure. As can be appreciated by one of skill in the art after consideration of the present disclosure, the other half (e.g. a second blade half 240) of the blade 232 mirrors e or is identical to the illustrated (e.g. the first) blade half 236. In this example, at a first distance D1 from the center axis 124 each blade 232 may have a first thickness T1, and at a second distance from the center axis 124 each blade 232 may have a second thickness T2. Moreover, each blade 232 may be symmetrical about the center axis 124, such that each blade half 236 and 240 of a given blade 232 may have a first thickness T1 at the first distance from the center axis 124 and a second thickness T2 at a second distance from the center axis 124. In accordance with still other embodiments, a first 604 and second 608 surface of each of the blades 232 may have the same thickness contour.

In accordance with further embodiments of the present disclosure, the contour of the surfaces 604 and 608 of a blade 232 can be contoured in various ways. For example, at a vertex of a triangle formed in part by two adjacent blade 232 have 236 or 240, the blade 232 surfaces 604 and 608 can feature an inner diameter fillet radius 604. As a further example, a straight taper section 608 can extend between the inner diameter fillet radius 604 and a first radiused portion 612. The first radiused portion 612 can extend to a thinnest portion 616, at which the thickness of the blade 232 is equal to T2. Between the thinnest portion 616 and an outer diameter portion, the blade 232 surfaces 604 and 608 can feature a second radiused portion 620. An outside diameter radiused portion 624 can be formed at the outer diameter of the blade 232.

In accordance with at least some embodiments of the present disclosure, the thinnest portion 616 is between 60% and 70% of the distance between the center axis 124 and the inner surface 216 of an end section 208. In accordance with further embodiments of the present disclosure, the first 612 and second 620 radiused portions can have the same or different curvatures. Moreover, the curvatures may have a constant radius, or can follow some other curves, such as a parabolic curve. Other variations are possible. For instance, either or both of the radiused portions 612 and 620 can be omitted. As another example, the straight taper section 608 can be omitted. In addition, to selected thicknesses, each blade 232 may feature selected contouring. Accordingly, the thickness of a blade 232 can be varied to form contours that follow straight lines, constant radius lines, varying radius lines, such as but not limited to parabolic lines, or combinations of lines of different configurations.

Figure 7:
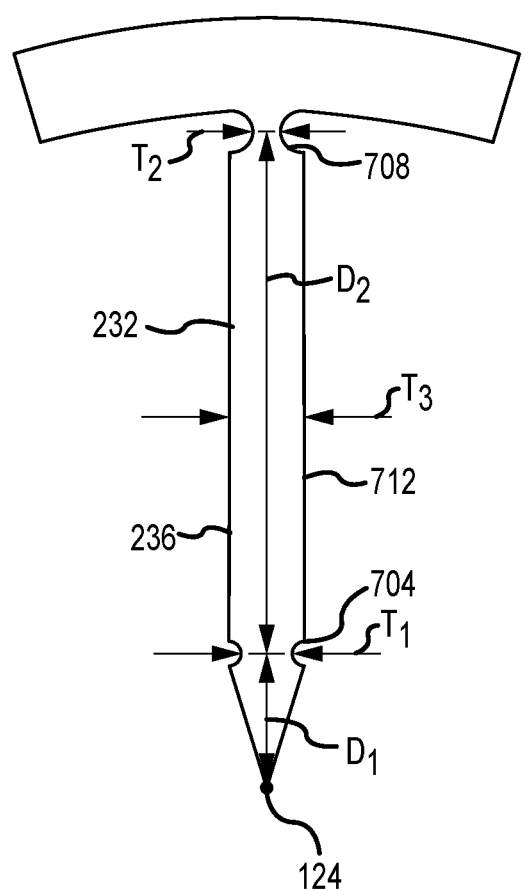
FIG. 7 is detailed view of a blade of a flexural pivot in accordance with other embodiments of the present disclosure.

With reference now to FIG. 7, a detail of a blade 232 half 236 or 240 in accordance with further embodiments of the present disclosure is depicted. In this example, the blade 232 section features a first notched portion 704 at a first distance D1 from the center axis 124, and a second notched portion 708 at a second distance D2 from the center axis 124. The thickness T1 of the blade 232 at the first notched portion 704 may be the same as or different than the thickness T2 of the blade 232 at the second notched portion 708. Between the notched portions 704 and 708, the blade 232 section features a straight taper section 712, along which the blade 232 may have a constant thickness T3. Alternatively, the thickness of the blade along the tapered section 712 may vary between the first notched section 704 and the second notched portion 708. For example, the thickness of the blade 232 within the straight taper section 712 may decrease with distance from the center axis 124.

Figure 8:
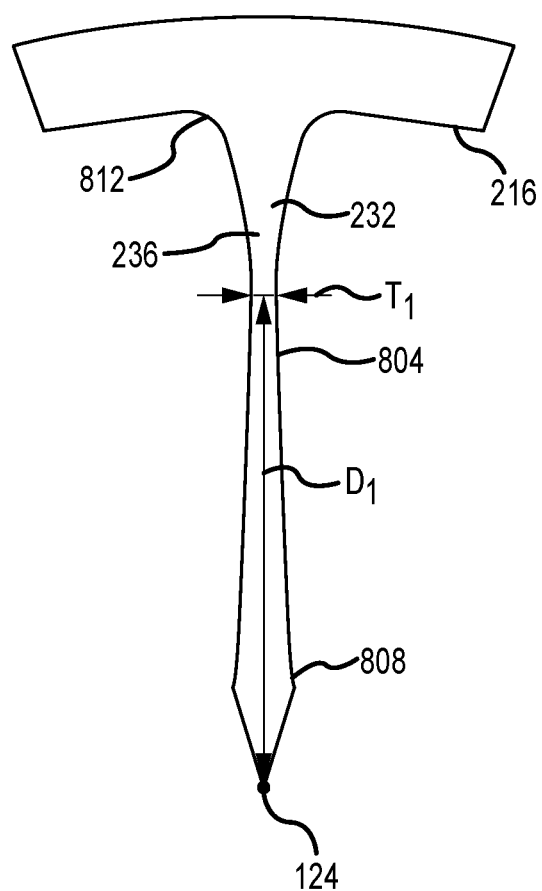
FIG. 8 is detailed view of a blade of a flexural pivot in accordance with other embodiments of the present disclosure.

In FIG. 8, a detail of a blade 232 half 236 or 240 in accordance with still other embodiments of the present disclosure is depicted. In this example, the blade 232 section features radiused surfaces 804 that are symmetric with one another, and that extend between an inner diameter fillet radius 808 and an outer diameter fillet radius 812. In this embodiment, the thickness T1 of the blade 232 at a first distance D1 from the center axis 124 may equal a minimum thickness of the blade 232. Moreover, the minimum thickness T1 of the blade 232 and may be at a location that is between 60% in 70% of the distance between the center axis 124 and the interior surface 216 of the corresponding end section 208.

Embodiments of the present disclosure, in which the thickness of a blade 232 varies with distance from the central axis 124 can increase the life of the flexural pivot 104. Moreover, fatigue life can be improved, while avoiding undesired increases in rotational stiffness. In accordance with further embodiments, the rotational stiffness of the flexural pivot 104 may be decreased as compared to designs having blades 232 with a constant thickness. Moreover, such advantages can be achieved while maintaining a desired strength or load carrying capacity. In addition, the shaping of the blades 232 does not affect the cost, manufacturing process, or installation of the flexural pivot 104.

In accordance with embodiments of the present disclosure, the various components of the flexural pivot 104, including the end sections 208 and the blades 232, are all formed from a single piece of material. This monolithic or integral structure is advantageous in that it avoids the need for joints, and for the need to weld, braze, bond or otherwise connect individual pieces at such joints.

Although embodiments featuring four blades 232 have been illustrated and described, embodiments of the present disclosure are not so limited. In particular, any number of blades 232 can be provided. Moreover, the links of the blades 232 can be varied, for instance in combination with variations in the thickness of the blades 232, to achieve desired load carrying capacities, fatigue life, and flexibility. In accordance with further embodiments of the present disclosure, the thinnest portion of the blades 232 is about two thirds of the length of the blade from the center axis 124 typically corresponds to an area of lowest stress. This provides greater flexibility, without decreasing the load carrying capacity or the fatigue life of the blades 232 and the flexural pivot 104 incorporating the blades 232. In addition, the blades 232 need not be rectangular and flat when viewed in a plane encompassing the center axis 124. Examples of alternate blade 232 geometries include, but are not limited to, hourglass and barrel shapes. In accordance with still further embodiments of the present disclosure, the blades 232 can have apertures or notches. As can be appreciated by one of skill in the art after consideration of the present disclosure, aspects of the blade 232 shaping can be varied and balanced to achieve desired load capacity, fatigue life, and bending resistance properties.

Figure 9:
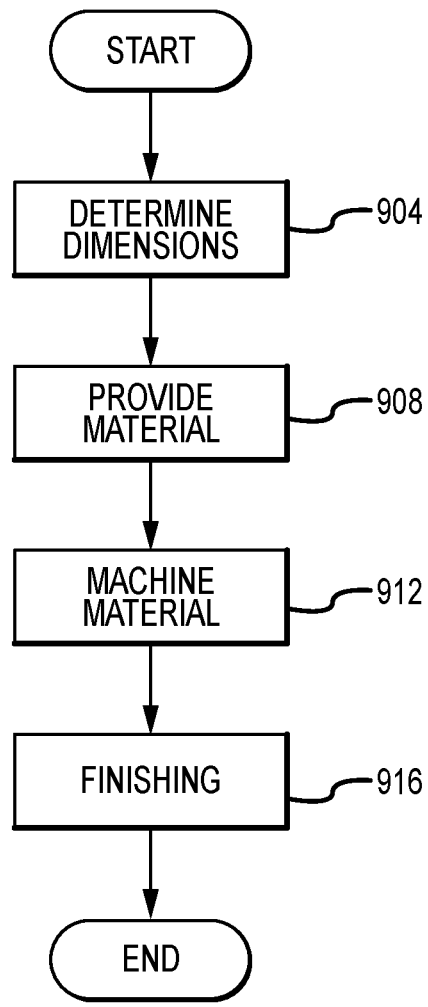
FIG. 9 is a flowchart illustrating aspects of method for providing a flexural pivot in accordance with embodiments of the present disclosure.

FIG. 9 is a flowchart depicting aspects of a method for providing a flexural pivot 104 in accordance with embodiments of the present disclosure. Initially, at step 904, the dimensions of the desired flexural pivot 104 are determined. This can include determining a desired size of the end sections 208, and the desired loadbearing capacity, fatigue life, centering force, and maximum angles of rotation provided by the flexural pivot 104. As part of determining the dimensions of the flexural pivot 104, the shape of the blades 232 can be determined. For example, finite element analysis can be used to configure and optimize the shape of the blades 232 in order to optimize rotational strength, rotational stiffness, rotational fatigue life, radial strength, radial stiffness, radial fatigue life, axial strength, axial stiffness, and axial fatigue life. At step 908, a block of material having dimensions as large or larger than the maximum outer dimensions of the desired flexural pivot 104 is provided. The block of material may be selected to provide desired strength and fatigue characteristics in the completed flexural pivot 104. Examples of suitable materials include aluminum, steel, titanium, plastic, or the like. Next, the block of material is machined to produce the flexural pivot 104, including the end sections 208 and the blades 232, where the blades 232 feature a thickness that varies with distance from the center axis 124 (step 912). As can be appreciated by one of skill in the art after consideration of the present disclosure, machining can include drilling, sawing, etching or other operations. As a particular example, such operations can include wire electrical discharge machining (EDM). As another example, such operations can include additive manufacturing techniques. At step 916, an optional finishing step of surface finishing, such as acid etching, anodizing, or plating can be performed. Accordingly, a monolithic or unitary structure, in which the various components of a flexural pivot 104, including end sections 208 and blades 232 that have varying thicknesses, are formed from a single block of material, is provided. By thus eliminating separate components within the flexural pivot 104, individual joints, which are potential points of failure, are reduced or eliminated. Moreover, the need to join individual components within the flexural pivot 104 is eliminated. In addition, manufacturing inconsistencies can be reduced or eliminated.

Although various examples of a flexural pivot 104 used in combination with a pivoted member or assembly 120 in the form of a mirror, such as a fast steering mirror, have been described, embodiments of the present disclosure are not so limited. For example, a flexural pivot 104 in accordance with embodiments of the present disclosure can be used as a support for any object, structure or component in which it is desirable to provide rotation about an axis, while inhibiting movement in other directions or dimensions. In addition, a flexural pivot 104 as disclosed herein can provide an increased fatigue life. Moreover, a flexural pivot 104 in accordance with embodiments of the present disclosure can be used in applications where a relatively high frequency of oscillation or change in angle is required or desirable. The flexural pivot 104 can also provide a self-centering force, that tends to bring the supported structure back to a neutral position relative to the base mounting structure.

The foregoing discussion of embodiments of the present disclosure has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A flexural pivot, comprising:
   a first housing;
   a second housing; and
   a plurality of blades, wherein each of the blades intersect one another along a center axis, wherein a first end of each of the blades is joined to an interior of the first housing, wherein a second end of each of the blades is joined to an interior of the second housing, wherein a first dimension of each of the blades at a first distance from the center axis is greater than the first dimension at a second distance from the center axis, wherein the first dimension at the second distance from the center axis is a minimum blade thickness, wherein for a first blade half of each blade the second distance is between 60-80% of a distance from the center axis to an interior of the first housing, and wherein for a second blade half of each blade the second distance is between 60-80% of a distance from the center axis to an interior of the second housing.

2. The flexural pivot of claim 1, wherein the first dimension of a second blade at the second distance from the center axis is the same as the first dimension of the first blade at the second distance from the center axis.

3. The flexural pivot of claim 1, wherein all of the blades are axially symmetric.

4. The flexural pivot of claim 1, wherein surfaces of the blades between the first distance from the center axis and the second distance from the center axis follow a first radius of curvature.

5. The flexural pivot of claim 1, wherein the surfaces of the blades between the first distance from the center axis and the second distance from the center axis are straight.

6. The flexural pivot of claim 1, wherein a width dimension of the blades is parallel to the center axis, wherein the first dimension of the blades is a thickness dimension, and wherein a length dimension of the blades is between the first and second ends of the blades.

7. The flexural pivot of claim 1, wherein a thickness of each of the blades between the first distance from the center axis and the second distance from the center axis varies so as to form contours that follow parabolic curves.

8. A flexural pivot, comprising:
   a first housing;
   a second housing; and
   a plurality of blades, wherein each of the blades intersect one another along a center axis, wherein a first end of each of the blades is joined to an interior of the first housing, wherein a second end of each of the blades is joined to an interior of the second housing, wherein a first dimension of each of the blades at a first distance from the center axis is greater than the first dimension at a second distance from the center axis, wherein for a first blade half of each blade included in the plurality of blades the second distance is between 60-70% of a distance from the center axis to an interior of the first housing, and wherein for a second blade half of each blade the second distance is between 60-70% of a distance from the center axis to an interior of the second housing.

9. The flexural pivot of claim 8, wherein the first dimension of a second blade at the second distance from the center axis is the same as the first dimension of the first blade at the second distance from the center axis.

10. The flexural pivot of claim 8, wherein all of the blades are axially symmetric.

11. A pivot assembly, comprising:
    a flexural pivot, the flexural pivot including:
       a first housing;
       a second housing; and
       a plurality of blades, wherein each blade is joined to every other blade along a centerline of the blade, wherein the centerline of each of the blades corresponds to a center axis, wherein a first end of each blade is interconnected to the first housing at an interior surface of the first housing, wherein a second end of each blade is interconnected to the second housing at an interior surface of the second housing, wherein each blade has a first thickness at a first distance from the centerline of the blade, wherein each blade has a second thickness at a second distance from the centerline of the blade, wherein the second thickness is a minimum thickness, wherein the first distance is less than the second distance, wherein, for the first end of each blade, the second distance is between 60% and 80% of a distance from the center axis to the interior surface of the first housing, and wherein, for the second end of each blade, the second distance is between 60% and 80% of a distance from the center axis to an interior surface of the second housing;
    a base assembly, wherein the first housing is fixed to the base assembly; and
    a pivoted assembly, wherein the second housing is fixed to the pivoted assembly.

12. The pivot assembly of claim 11, wherein the first distance is from 60% to 70% of a distance from the center axis to a respective end of the blade.

13. The pivot assembly of claim 11, wherein each blade has the first thickness at a third distance from the centerline of the blade.

14. The pivot assembly of claim 13, wherein the first thickness is a minimum thickness.

15. The pivot assembly of claim 14, wherein the second thickness is greater than the first thickness, and wherein the second distance is between the first distance and the third distance.

16. The pivot assembly of claim 15, wherein the each of the blades is axially symmetric.

17. The pivot assembly of claim 16, wherein a surface of each of the blades has a constant radius portion.

18. The pivot assembly of claim 16, wherein a surface of each of the blades has a flat section and a curved section.

19. The pivot assembly of claim 11, wherein the flexural pivot is a monolithic structure.

20. A method of for providing a flexural pivot, comprising:
- providing a single block of material;
- machining components from the single block of material, wherein the components include:
  - a first housing;
  - a second housing; and
  - a plurality of blades, wherein each of the blades intersect one another along a center axis, wherein a first end of each of the blades is joined to an interior of the first housing, wherein a second end of each of the blades is joined to an interior of the second housing, wherein a first dimension of each of the blades at a first distance from the center axis is greater than the first dimension at a second distance from the center axis, wherein the first dimension at the second distance from the center axis is a minimum blade thickness, wherein for a first blade half of each blade the second distance is between 60-70% of a distance from the center axis to an interior of the first housing, and wherein for a second blade half of each blade the second distance is between 60-70% of a distance from the center axis to an interior of the second housing.

* * * * *